(12) United States Patent
Kristensson et al.

(10) Patent No.: US 8,165,649 B2
(45) Date of Patent: Apr. 24, 2012

(54) TORSION SPRING

(75) Inventors: Daniel Kristensson, Saxtorp (SE);
Magnus Mattsson, Malmo (SE);
Henrik Martensson, Lund (SE); Yasir Yousefi, Oxie (SE)

(73) Assignee: Sony Ericsson Mobile Communications AB, Lund (SE)

( * ) Notice: Subject to any disclaimer, the term of this patent is extended or adjusted under 35 U.S.C. 154(b) by 366 days.

(21) Appl. No.: 12/433,172

(22) Filed: Apr. 30, 2009

(65) Prior Publication Data

US 2010/0279748 A1    Nov. 4, 2010

(51) Int. Cl.
*H04M 1/00*    (2006.01)
(52) U.S. Cl. .................................. 455/575.4; 455/575.1
(58) Field of Classification Search ............... 455/575.1, 455/575.4; 361/814
See application file for complete search history.

(56) References Cited

U.S. PATENT DOCUMENTS

| 7,627,355 | B2 * | 12/2009 | Amano et al. | ............. 455/575.4 |
| 7,953,464 | B2 * | 5/2011 | Park et al. | ................... 455/575.4 |
| 2005/0288077 | A1 * | 12/2005 | Wu | ............................. 455/575.4 |
| 2006/0053847 | A1 * | 3/2006 | Taki et al. | ........................ 70/247 |

* cited by examiner

*Primary Examiner* — Brian Young
(74) *Attorney, Agent, or Firm* — Renner, Otto, Boisselle & Sklar, LLP

(57) ABSTRACT

The invention is about a sliding mechanism for a portable electronic device. Among others, the sliding mechanism comprises a first part with a guiding groove where the first part is arranged along a longitudinal axis. The sliding mechanism also comprises a second part which is movable along the longitudinal axis in relation to the first part. Additionally, the second part comprises a protrusion which is movable in the guiding groove. Moreover, the sliding mechanism further comprises an element which is used for transferring torque to one of the parts of the sliding mechanism, such that the protrusion is held in at least two stable positions in the guiding groove.

11 Claims, 8 Drawing Sheets

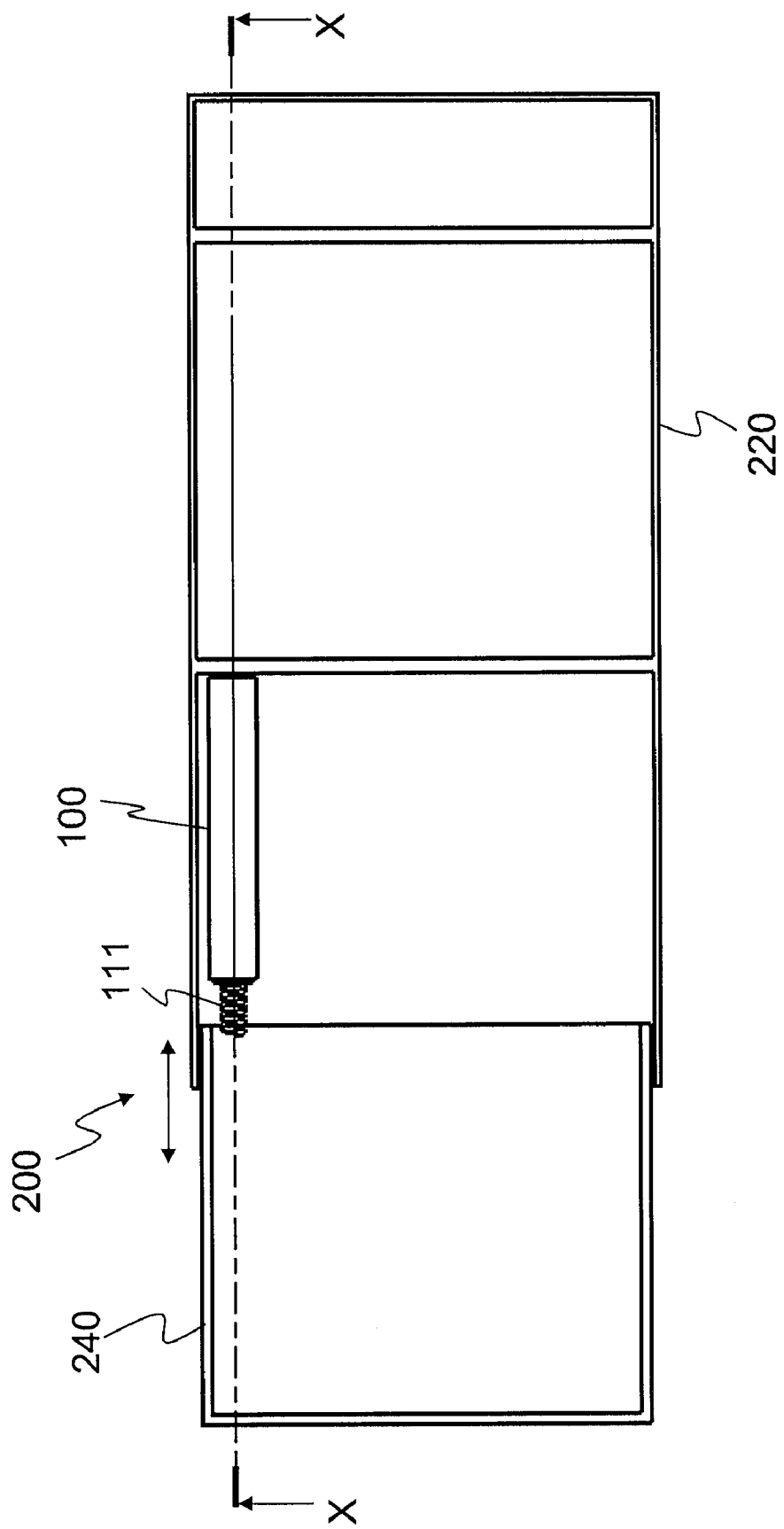

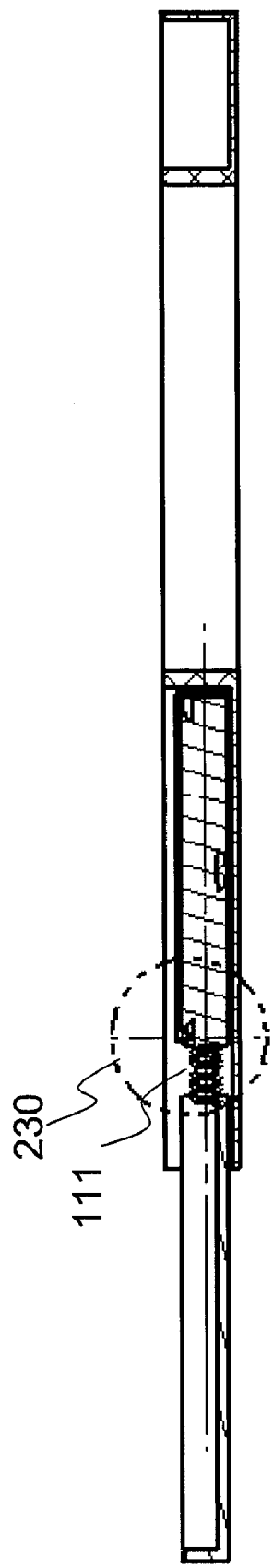
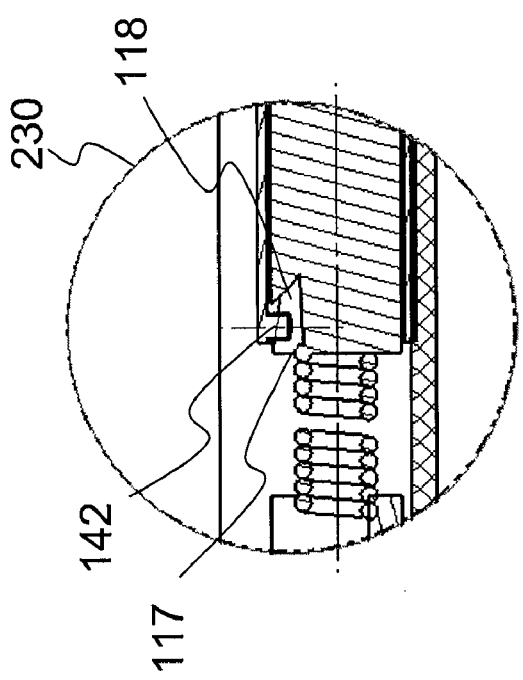
Fig. 5b
Fig. 5c

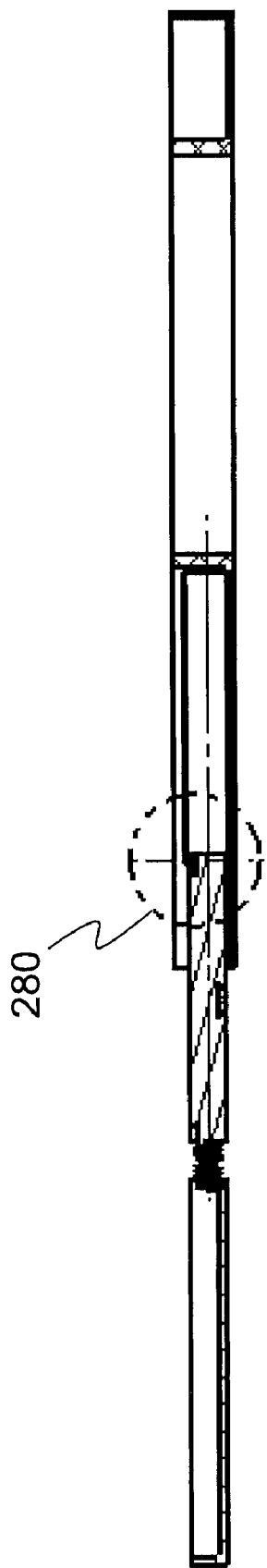
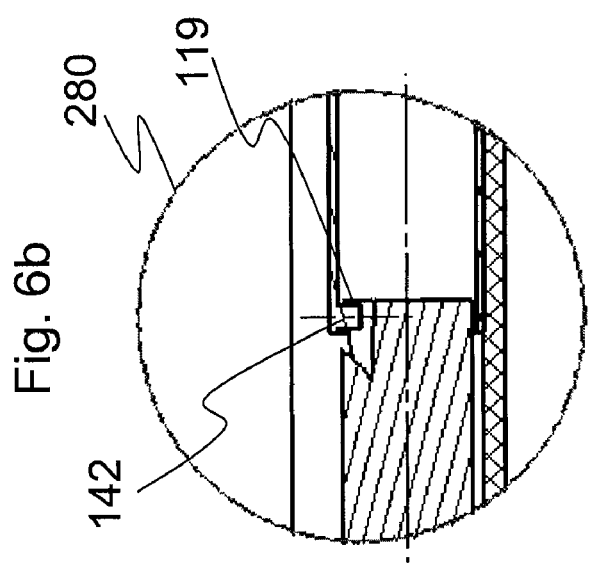
Fig. 6b
Fig. 6c

TORSION SPRING

TECHNICAL FIELD

The present invention relates a sliding mechanism for a portable electronic device.

BACKGROUND ART

The first commercially attractive cellular phones or terminals were introduced in the market at the end of the 1980's. Since then, a lot of effort has been made in making smaller radio communication terminals, with much help from the miniaturisation of electronic components and the development of more efficient batteries. Today, numerous manufacturers offer pocket-sized radio communication terminals with a wide variety of capabilities and services.

In order to attract customers the terminal manufacturers have therefore taken further measures to strengthen their position in the competition. Size and cost is getting more and more essential in mobile handsets design. The marked trend is that mobile handsets are getting thinner. Another market trend is that the shell of the mobile handset is divided into an upper and lower casing. The upper casing is connected to and movable in relation to the lower casing via a slider mechanism.

The slider mechanism comprises a slider that is slideable connected to a base. The slider is connected to the upper casing and the base is connected to the lower casing. A spring member is in one end connected to the slider and in the other end connected to the base. When the mobile handset is arranged in its closed position, the spring member presses the slider away from the base and locks the upper casing on top of the lower casing. To arrange the mobile handset in its open position, the upper casing is slideable moved in relation to the lower casing. The slider is moved towards the base and the spring member is compressed and rotated around its connection to the base. As the upper casing is moved further, the first end of the spring member has been moved passed the second end of the spring member. The spring member is now able to expand and to press the slider away from the base in an opposite direction compared to the closed position. The mobile handset is now arranged in its open position.

One known issue with slider mechanisms according to known technology is that they take up a lot of space as they are moved between the open and closed position.

Another disadvantage is that they increase the thickness of the radio communication terminal.

A further problem is that the miniaturisation of the parts of the slider mechanism is expensive.

SUMMARY OF THE INVENTION

At least some of the problems encountered in known technology are addressed by the solution proposed according to independent claim 1.

One aspect of the solution according to the present invention is related to a sliding mechanism for a portable electronic device, where the sliding mechanism comprises a first part arranged along a longitudinal axis, where the first part comprises a guiding groove. Furthermore, the sliding mechanism comprises a second part movable along the longitudinal axis in relation to the first part, where the second part comprises a protrusion movable in the guiding groove. Also, the sliding mechanism further comprises an element for transferring torque to one of the parts of the sliding mechanism, such that the protrusion is held in at least two stable positions in the guiding groove.

This solution has the advantage that the sliding mechanism does not significantly add to the thickness of the portable electronic device. Thus, such an electronic device can be made very thin and easy to stow in a pocket.

Moreover, the sliding mechanism has a simple construction and is therefore easy to manufacture and assemble. This keeps the production cost for the sliding mechanism low.

In one variant of the invention the first part may be arranged in the second part. In this context it is also worth mentioning that the first and second parts may have any cross section as long as the protrusion is movable in the guiding groove of the first part.

Moreover, the guiding groove may be arranged along the outer circumference of the first part. However, it may be equally possible to have the guiding groove arranged along the inner circumference of the second part, while the protrusion is arranged in the first part. The main point here is that the transfer of torque by means of the element for transferring torque is transferred to one of the parts, such that the protrusion in the guiding groove can be held in at least two stable positions.

In yet another variant of the present invention, the element for transferring torque may be arranged at one end of the first part.

An example of the element for transferring torque may be a torsion spring, but it may equally be a piece of elastic twistable material, such as sheet of metal, plastic or a rubber element. In any case, the element for transferring torque may be adapted to urge the second part into one of the at least two stable positions. In order to prevent further movement of the protrusion beyond the first and second stable positions the sliding mechanism may comprise stops. These stops may either be arranged at the end portions of the guiding groove or in the portable electronic device itself.

In one embodiment of the present invention the first and second parts of the sliding mechanism may be arranged in a first and second half of a mobile portable electronic device, respectively.

This portable electronic device may for example be a mobile terminal.

BRIEF DESCRIPTION OF THE DRAWINGS

These and other advantages of the present invention will be more readily understood by studying the detailed description below together with the accompanying drawings.

FIG. 5a illustrates a cross-sectional view of two halves of a portable electronic terminal comprising the sliding mechanism of FIG. 1 when the sliding mechanism is in a closed position.

FIG. 5b illustrates a cross sectional view of both the halves of the portable electronic terminal comprising the sliding mechanism from FIG. 5a as well as the sliding mechanism itself.

FIG. 5c illustrates a detailed cross-sectional view of the sliding assembly contained in the two halves of the portable electronic terminal from FIG. 5b.

FIG. 6b illustrates a cross sectional view of both the halves of the portable electronic terminal comprising the sliding mechanism from FIG. 6a as well as the sliding mechanism itself.

FIG. 6c illustrates a detailed cross-sectional view of the sliding assembly contained in the two halves of the portable electronic terminal from FIG. 6b.

DETAILED DESCRIPTION

Figure 1:
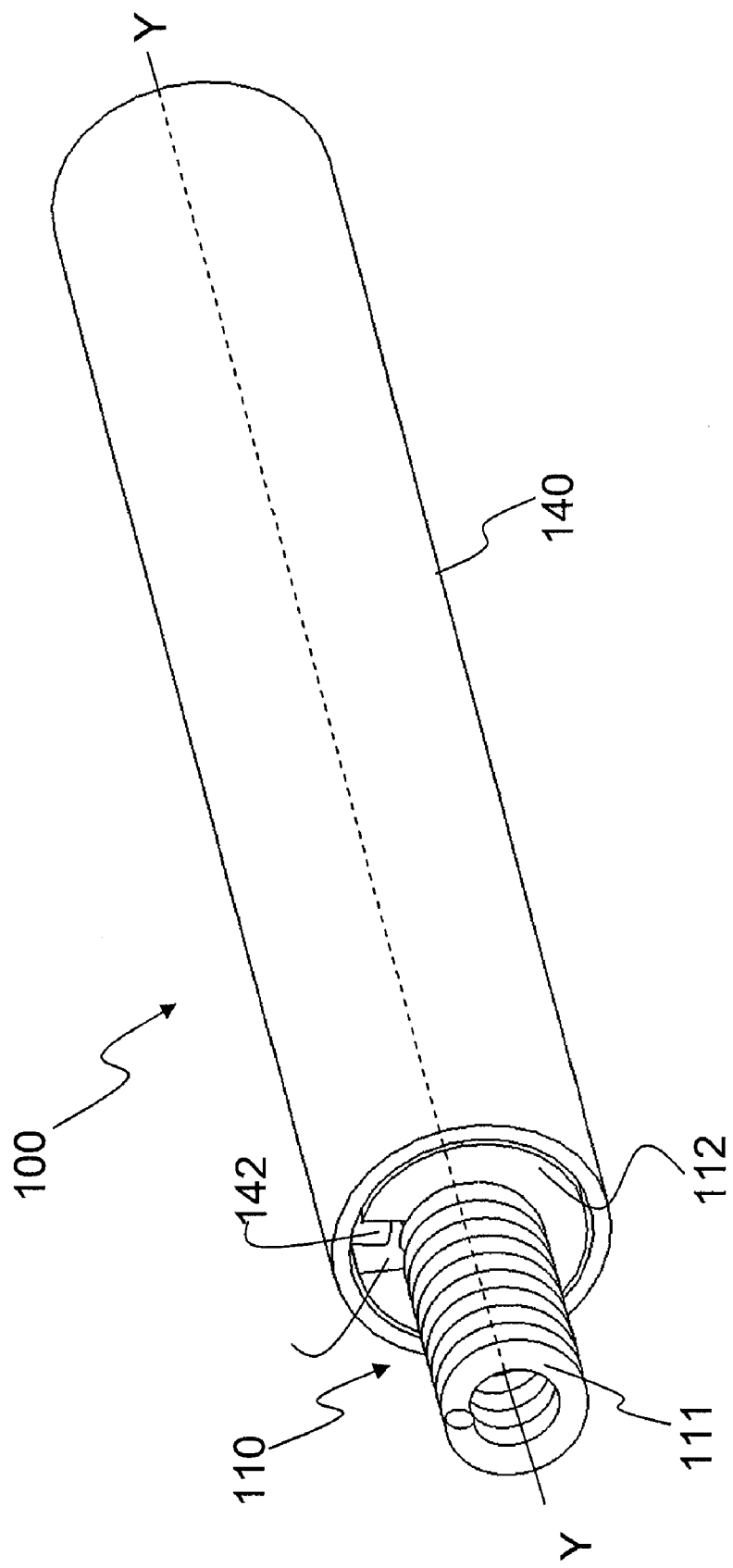
FIG. 1 illustrates a perspective view of a sliding mechanism according to one embodiment of the present invention.

FIG. 1 illustrates a sliding mechanism 100 according to one embodiment of the present invention. As can be seen from the figure, the sliding mechanism 100 is arranged along a longitudinal axis Y and comprises a first part 110 and second part 140. The first part 110 comprises a torsion spring 111 and a cylindrical tubular shaped portion 112. This cylindrical tubular shaped portion is arranged inside the second part 140 which also has the shape of a cylindrical tube. Moreover, the first part 110 further comprises a guiding recess 118 in which a protrusion 142 from the second part 140 is arranged. This protrusion 142 is located proximate one end of the second part 140 and arranged on the inner portion of the cylindrical tube 140.

Figure 2:
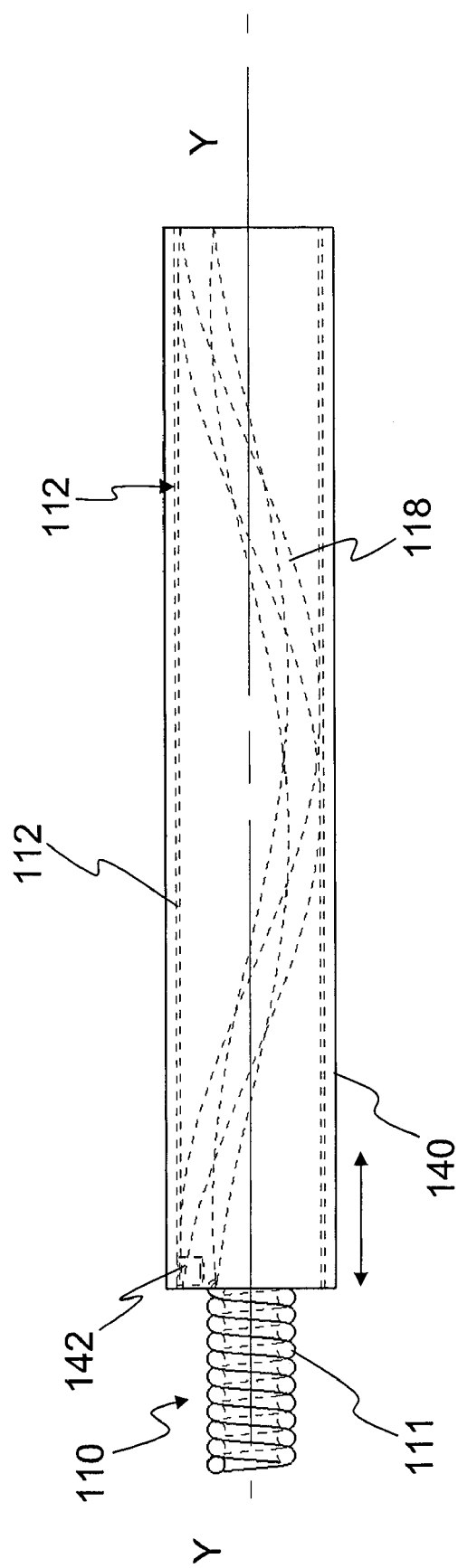
FIG. 2 illustrates a transparent view of a sliding mechanism according to one embodiment of the present invention.

FIG. 2 illustrates the sliding mechanism of FIG. 1 in a vertical cross section. While the outer contours of the first and second parts 110 and 140 are drawn by solid lines, those elements of the first and second parts 110 and 140 which are not visible from outside are drawn by dashed lines.

As can be seen from the figure, the torsion spring 111 is connected to the cylindrical tube portion 112 shown in cross-section and drawn by dashed lines. Moreover, the guiding recess 118 from FIG. 1 is shown in more detail. In FIG. 2 it is illustrated as a curved recess 118 drawn by dashed lines and running along one part of the circumference (not shown) of the cylindrical tube portion 112.

Also, the protrusion 142 in the second part 140 has the form of a pin and is adapted to move in the curved recess 118 on the circumference of the cylindrical tube portion 112 along the longitudinal axis Y in the directions indicated by the double arrow in FIG. 1.

Now, the function of the sliding mechanism 100 will be explained.

The torsion spring 111 in the first part 100 is biased, such that it is able to transmit a torque to the cylindrical part 112 of the first element 110. At the same time, since the protrusion in the first part 110 is movable in the curved recess 118 in the second part, the torque from the cylindrical tube portion 112 urges the protrusion 142 in the second part 140 towards the spring 111. This results in a movement of the second part 140 it in the direction of longitudinal axis Y towards the spring.

However, to prevent further movement of the protrusion 142 beyond the end-point 114 of the curved recess 118 due to the torque transmitted from the torsion spring 110 towards cylindrical tube portion 112, a stop has to be arranged. This will be explained more in detail in FIGS. 5c and 6c.

Figure 3:
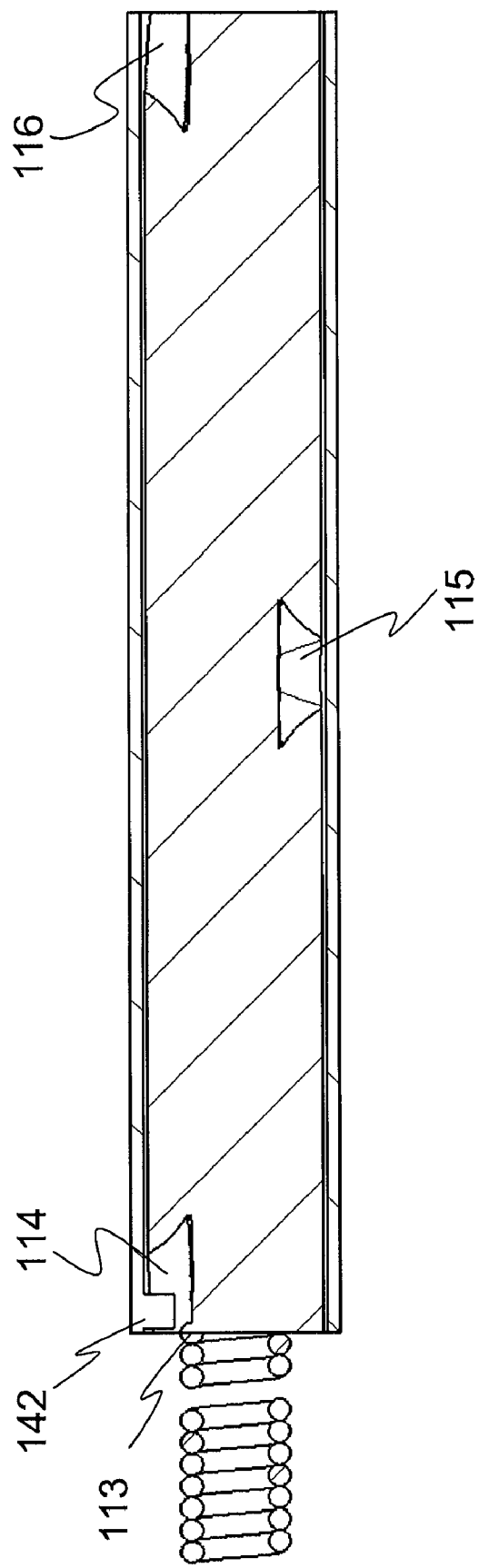
FIG. 3 illustrates a cross-section of the sliding mechanism from FIG. 1 exposing a first and a second part.

As shown in FIG. 3, the protrusion 142 is held in the leftmost position at the left end 114 of the circumferential groove 118 by means of the stop and the torque transmitted by the torsion spring 111 towards the cylindrical tube portion 112 urging the protrusion 142 against the stop. Thus, a stable position for the protrusion 142 is achieved.

When used in a portable electronic device comprising two halves, where the first part 100 of the sliding mechanism 100 is arranged in one of the halves, while the second part 140 is arranged in the other half, this stable position may correspond to a position where the portable electronic device is closed.

This will be explained more in detail in FIG. 5a.

Likewise, when the protrusion 142 in the rightmost position at the right end 116 of the circumferential groove 118, the protrusion 142 is prevented from further movement along the longitudinal axis Y in the direction away from the torsion sprig 111 by means of another stop (not shown). As in the case where the protrusion 142 is in the leftmost position described earlier, the torque transmitted by the torsion spring 111 onto the cylindrical tube portion 112 is urging the protrusion 142 against this other stop thus keeping it in a second stable position.

It should be added that the present invention is by no means limited to the embodiment illustrated in FIG. 2. For example, the torque to the protrusion 142 in the second part 140 may be transmitted by any element for transferring torque, such as a piece of twisted elastic material, which may be of metal, plastic, rubber or some other elastic material.

Also, the torque may be transmitted by a hydraulic means or by means of an electrical engine. The main point is that torque is transmitted from the first part 110 to the second part 140 by means of an element for transferring torque, such that the protrusion 142 is held in a stable position and such that an outer force has to be applied in the direction of the longitudinal axis Y in order to bring the protrusion 142 out of the stable position.

Figure 4:
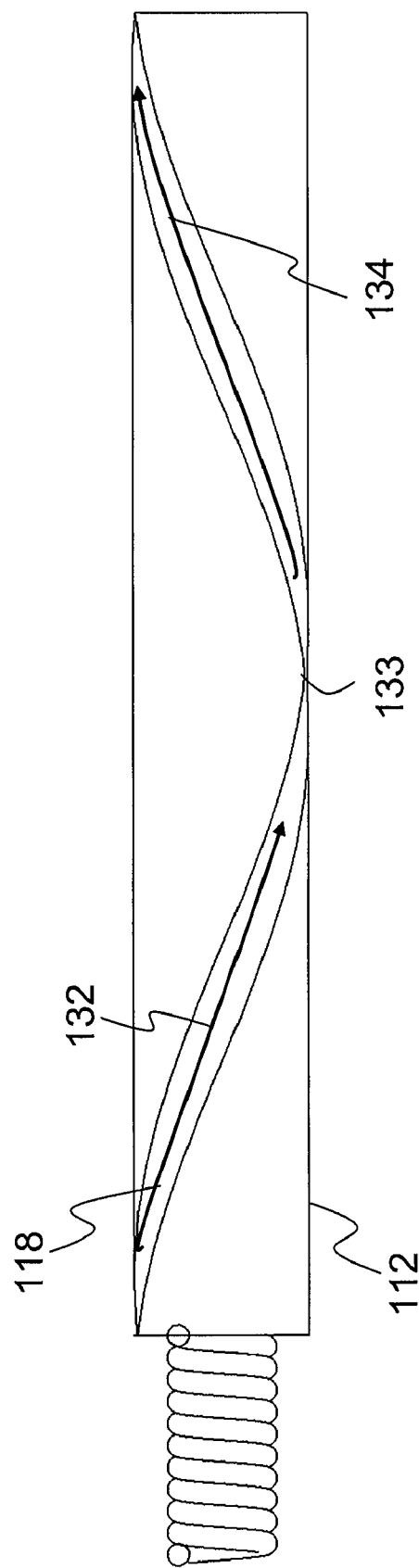
FIG. 4 illustrates a cross-section of the second part of the sliding mechanism from FIG. 1.

Turning now to FIG. 4, the movement of the protrusion 142 along the curved recess 118 of the cylindrical tube portion 112 is indicated by the arrows 132 and 134.

Starting from the leftmost end 114 of the curved recess 118 indicated in FIG. 2, the protrusion can move along the direction indicated by arrow 132. This movement corresponds to the movement of the second part 140 in relation to the first part 110 along the longitudinal axis Y away from the torsion spring 111. The movement would correspond to a gradual opening of the sliding mechanism 100, such as when a portable electronic device is opened, in whose halves the sliding mechanism 100 is integrated. Up to the middle position 133, torque transmitted by the torsion spring 111 onto the cylindrical tube portion 112 must be overcome by an outside force, such as the muscle force of a user of the portable electronic device. Here, the torsion spring 111 should be designed, such that the torque transmitted by it onto the cylindrical tube portion 112 makes for a comfortable user experience when opening and closing a portable electronic device into which the sliding mechanism 100 is integrated. Thus, accidental opening of the portable electronic device should be prevented, while at the same time making it not too difficult for the user to open the portable electronic device.

Now, when moving the protrusion 142 beyond the middle section 133 of the curved recess 118 in the direction of the second arrow 134, torque transmitted from the torsion spring 111 onto the cylindrical tube portion 112 will push the protrusion 142 into the stable position at the rightmost end 116 of the curved recess 118 where it comes into contact with the other stop (not shown).

It should be mentioned here that the curved recess 118 may consist of several middle sections 133, thus making it possible for the sliding mechanism to be transferred into more than two stable positions. Also, the middle section itself may represent a stable position for the sliding mechanism. In this case, the middle section of such a circumferential groove should be formed as a recess thereby allowing the protrusion 142 to be held in a stable position by the torque transmitted by the torsion spring 111 onto the cylindrical tube portion 112 and the walls of the tube portion 111 against which the protrusion is pushed by the torque. In this way an arbitrary number of stable positions for the sliding assembly can be achieved translating into an arbitrary number of stable positions for the portable electronic device in whose halves the sliding mechanism is integrated.

FIG. 5a illustrates one example of a portable electronic device 200 shown in a cross-sectional view. As can be seen from the figure, the portable electronic device 200 comprises a first half 220 to which the second part 140 of the sliding mechanism 100 is attached. It also comprises a second half 240 to which the torsion spring 111 of the first part 110 is attached. The second half 240 is movable along a direction parallel to the axis centre axis of sliding mechanism 100 in the directions indicated by the double-arrowed line. As can be seen from the illustration, the second half 240 is movable into and out of the first half 220. However, the portable electronic device 200 may comprise other constructions of the halves, such as one of the halves being movable above the other. In such a scenario, one of the halves when moving in relation to the other half, would cover the other half.

In the illustration in FIG. 5a, the sliding mechanism 100 in the portable electronic device 200 is shown in a closed position. This closed position corresponds also to a fully closed position of the portable electronic device. In this situation, only the most necessary functional elements of user interface of the portable electronic device 200 may be visible. As can also be seen from the figure, the sliding mechanism 100 according the invention does not add to the thickness of the portable electronic device. Therefore, while providing a satisfactory sliding function, the portable electronic device can be easily stowed away in a pocket without taking too much space.

FIG. 5b illustrates a cross section of the sliding mechanism 100 and the upper part of the portable electronic device 200 along the line X-X. Here, the protrusion 142 in the second part 140 of the sliding mechanism 100 is in the leftmost position on the curved groove 118 as was previously depicted in FIG. 2. A detailed illustration 230 of the positions in which the components of the sliding mechanism 100 find themselves is given in FIG. 5c.

In FIG. 5c a first stop 117 is shown, preventing further movement of the protrusion 142 in the direction of the torsion spring 111. While the first stop 117 may be part of the cylindrical tube portion 112 itself, it may equally be formed in the second half 240 of the portable electronic device 200, as desired.

Figure 6A:
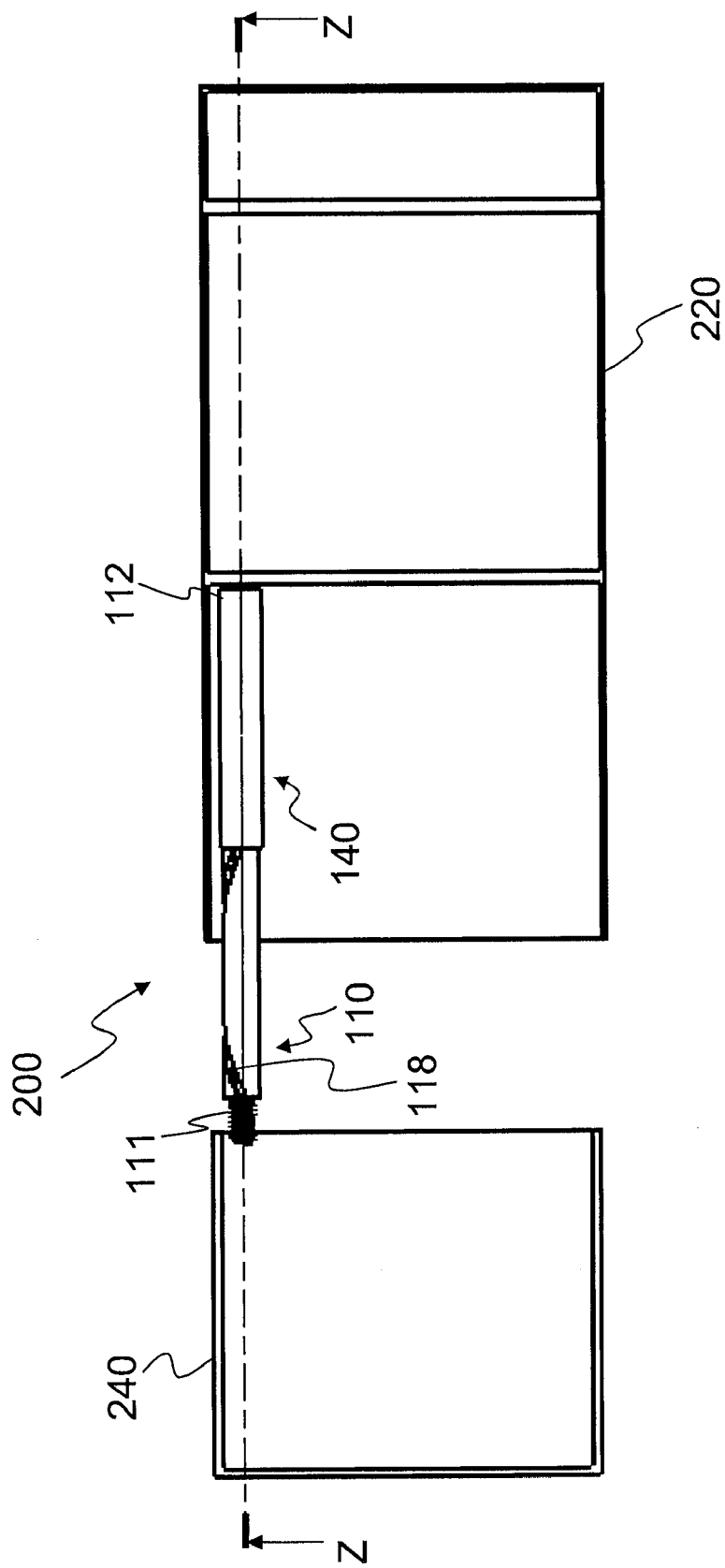
FIG. 6a illustrates a cross-sectional view of two halves of a portable electronic terminal comprising the sliding mechanism of FIG. 1 when the sliding mechanism is in an open position.

FIG. 6a shows a cross sectional view of the portable electronic device 200 where the sliding mechanism integrated into the two halves 220 and 240 of the portable electronic device 200 is in a fully open position. This fully open position corresponds to the fully open position of the portable electronic device 200. In this situation, an advanced set of user interface elements of the portable electronic device 200 may be shown to the user. Here, the curved recess 118 of the cylindrical tube portion 112 is partly visible. Also worth noticing is that the torsion spring 111 has not been extended along the direction of the longitudinal axis Y of the sliding mechanism 100. While this is an ideal situation, the torsion spring 111 can be designed with a spring constant, such that its extension along the longitudinal axis Y is kept to a minimum. After all, it is the torque transmitted by the torsion spring 111 onto the cylindrical tube portion 112 resulting in the movement of the protrusion 142 in the second part 140 along the curved recess 118 that is interesting.

FIG. 6b illustrates a cross section of the sliding mechanism 100 and the upper part of the portable electronic device 200 along the line Z-Z. Here, the protrusion 142 in the second part 140 of the sliding mechanism 100 is in the rightmost position on the curved groove 118 as illustrated in FIG. 2. A detailed illustration 230 of the positions in which the components of the sliding mechanism 100 find themselves is given in FIG. 5c.

In FIG. 6c, the position of the protrusion 142 at the rightmost end of the curved recess 118 is shown in detail. Here, further movement of the protrusion 142 in the direction away from the torsion spring 111 is prevented by a second stop 119 which may be either formed in the cylindrical tube portion 112 of the first part 110 or in the first part 220 of the portable electronic device 200 itself, as desired.

In this position, the protrusion 142 is urged against the second stop 119 by the torque transmitted from the torsion spring 111 onto the cylindrical tube portion 112, thus keeping it in a second stable position.

It should be mentioned that the example embodiments of the sliding mechanism 100 as illustrated in FIGS. 1-6c are not to be interpreted as limitations of the invention, but should be seen as for illustration only.

For example, the sliding mechanism according to the present invention is not limited to the first portion and the second part 112 and 140 being cylindrical tubes. They may equally have square-shaped, rectangular, triangular, octagonal and other cross-sections. Also, the recess may not necessarily have the shape of a curved recess as shown in FIGS. 1-6c. It may have any other shape as long as it is able to guide the protrusion through it. In one variant, the curved recess may be formed as a recess or groove running along the circumference of the first part 110 in the form of a spiral.

Moreover, the protrusion and the curved recess may not necessarily be formed in the second and first parts of the sliding mechanism, respectively. It may be equally possible to arrange the protrusion in the first part and the curved recess or groove in the second part. This groove may either be formed on the inside surface of the second part or be formed as a recess running along at least along one part of the circumference of the second part. In this arrangement, torque will transmitted by the torsion spring or any other element for transferring torque to the protrusion thus urging it to move in the recess formed in the second part.

The present invention is also related to method for assembling a sliding mechanism for a portable electronic device, comprising the steps:

a) providing a first part with a guiding groove and arranging the first part along a longitudinal axis;

b) providing a second part with a protrusion movable in the guiding groove of the first part; the second part being movable along the longitudinal axis of the first part c) providing an element for transferring torque one of the parts of the sliding mechanism, such that the protrusion is held in at least two stable positions.

In one variant of the method the first and/or the second part have a cylindrical cross-section. Also, the first part may be arranged inside the second part.

Other variants of the present invention could also be contemplated by the skilled person who has studied the above disclosure.

Ultimately, the spirit and scope of the present invention is only limited by the accompanying patent claims.

The invention claimed is:

1. A sliding mechanism for a portable electronic device comprising:

a first part arranged along a longitudinal axis, the first part comprising a guiding groove;

a second part movable along the longitudinal axis in relation to the first part, the second part comprising a protrusion movable in the guiding groove; wherein the sliding mechanism further comprises an element for transferring torque to one of the parts of the sliding mechanism, such that the protrusion is held in at least two stable positions in the guiding groove, and wherein the first part is arranged in the second part.

2. A sliding mechanism for a portable electronic device comprising:

a first part arranged along a longitudinal axis, the first part comprising a guiding groove;

a second part movable along the longitudinal axis in relation to the first part, the second part comprising a protrusion movable in the guiding groove; wherein the sliding mechanism further comprises an element for transferring torque to one of the parts of the sliding mechanism, such that the protrusion is held in at least two stable positions in the guiding groove, wherein the guiding groove is arranged along the outer circumference of the first part, and wherein the element for transferring torque is arranged at one end of the first part.

3. Sliding mechanism according to claim 1, wherein the element for transferring torque comprises a torsion spring.

4. Sliding mechanism according to claim 1, wherein the element for transferring torque comprises elastic twistable material.

5. A sliding mechanism for a portable electronic device comprising:

a first part arranged along a longitudinal axis, the first part comprising a guiding groove;

a second part movable along the longitudinal axis in relation to the first part, the second part comprising a protrusion movable in the guiding groove; wherein the sliding mechanism further comprises an element for transferring torque to one of the parts of the sliding mechanism, such that the protrusion is held in at least two stable positions in the guiding groove, wherein the element for transferring torque is adapted to urge the second part into a one of the at least two stable positions, and further comprising stops arranged to prevent further movement of the protrusion beyond the first and second stable positions.

6. Sliding mechanism according to claim 1, wherein the first and second parts are arranged in a first and second half of a mobile portable electronic device, respectively.

7. Sliding mechanism according to claim 1, wherein the portable electronic device is a mobile terminal.

8. Sliding mechanism according to claim 2, wherein the first and second parts are arranged in a first and second half of a mobile portable electronic device, respectively.

9. Sliding mechanism according to claim 2, wherein the portable electronic device is a mobile terminal.

10. Sliding mechanism according to claim 5, wherein the first and second parts are arranged in a first and second half of a mobile portable electronic device, respectively.

11. Sliding mechanism according to claim 5, wherein the portable electronic device is a mobile terminal.

* * * * *